(12) United States Patent
Periyalwar et al.

(10) Patent No.: US 6,930,470 B2
(45) Date of Patent: Aug. 16, 2005

(54) SYSTEM AND METHOD FOR CODE DIVISION MULTIPLE ACCESS COMMUNICATION IN A WIRELESS COMMUNICATION ENVIRONMENT

(75) Inventors: Shalini S. Periyalwar, Ottawa (CA); Bassam M. Hashem, Nepean (CA); Leo L. Strawczynski, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 852 days.

(21) Appl. No.: 09/797,273

(22) Filed: Mar. 1, 2001

(65) Prior Publication Data

US 2002/0122402 A1 Sep. 5, 2002

(51) Int. Cl.$^7$ .................................................. H04L 5/04
(52) U.S. Cl. ........................ 320/204; 370/342; 455/422
(58) Field of Search ................................ 370/203–204, 370/206, 208–211, 310, 320, 324, 328, 335–342, 350; 455/403–422, 426, 429, 432, 433, 435

(56) References Cited

U.S. PATENT DOCUMENTS

| | | | |
|---|---|---|---|
| 5,390,234 A | * 2/1995 | Bar-Noy et al. | 455/456.1 |
| 5,396,645 A | 3/1995 | Huff | |
| 5,711,005 A | * 1/1998 | Farrag | 455/441 |
| 5,757,846 A | * 5/1998 | Vasudevan | 375/130 |
| 5,787,348 A | 7/1998 | Willey et al. | |
| 6,014,566 A | * 1/2000 | Owada | 455/444 |
| 6,141,547 A | * 10/2000 | Rousseau et al. | 455/426.1 |
| 6,208,861 B1 | * 3/2001 | Suzuki | 455/441 |
| 6,335,923 B2 | * 1/2002 | Kubo et al. | 370/335 |
| 6,542,471 B1 | * 4/2003 | Ito | 370/252 |

FOREIGN PATENT DOCUMENTS

| | | |
|---|---|---|
| DE | 197 41 701 A1 | 3/1999 |
| EP | 0 946 072 A1 | 9/1999 |
| EP | 1 059 818 A2 | 12/2000 |
| EP | 1 059 818 A3 | 2/2002 |
| WO | WO 00/ 38466 A | 6/2000 |
| WO | WO 01/33742 A1 | 5/2001 |

OTHER PUBLICATIONS

Een–Kee Hong et al., "Synchronous Transmission Technique for the Reverse Link in DS–CDMA Terrestrial Mobile Systems," IEEE Transactions on Communications, Nov., 1999, 4 pages (pp. 1632–1635).

Ramjee Prasad and Tero Ojanperil, "An Overview of CDMA Evolution Toward Wideband CDMA," IEEE Communications Surveys, Fourth Quarter 1998, 28 pages (pp. 2–29).

"Code Selection," http://cas.et.tudel.nl/~glas/thesis/node28html, 8 pages, downloaded Oct. 18, 2000.

(Continued)

Primary Examiner—Hassan Kizou
Assistant Examiner—Dmitry Levitan
(74) Attorney, Agent, or Firm—Christopher & Weisberg, P.A.

(57) ABSTRACT

A method, device and base station for using a code division multiple access carrier for wireless reverse link communication between the device and the base station. An operational profile of the device is determined in which the operational profile includes a degree of unit mobility. A first carrier for wireless code division multiple access communication from the device to the base station is selected based on the determined operational profile of the device. A wireless communication link between the device and the base station is established using the first carrier. According to one aspect, the first carrier is one of an asynchronous code division multiple access signal and a synchronous code division multiple access signal.

27 Claims, 4 Drawing Sheets

"The Principles of Spread Spectrum Communication,"http://cas.et.tudelft.nl~glas/ssc/techn/techniques.html, 7 pages, downloaded Oct. 18, 2000.

Brian O'Shaughnessy, "The Move to CDMA: Bell Mobility's Technology Decision," http://www.cdg.org/features/GuestCol/oshaughnessy.html, 4 pages, downloaded Sep. 18, 2000.

"About CDMA Technology, Standards,"http://www.cdg.org/tech/a ross/Standards.html, 2 pages, downloaded Sep. 18, 2000.

S–CDMA, Sychronous Code Division Multiple Access, http://register.cnet.com/Resources/Info/Glossary/Terms/scdma.html, 1 page, downloaded Sep. 18, 2000.

"CDMA Explained," http://www.cdma.com/cda/tech/3g/overview/0,1751,00.html, 2 pages, downloaded Sep. 18, 2000.

"About CDMA," http://www.cdma.com/cda/tech/aboutcdma/0,1704,3,00.html, 3 pages, downloaded Sep. 18, 2000.

"About CDMA Digital Phones, "http://www.kyocera-wireless.com/cdma/cdma-advantages.html, 2 pages, downloaded Sep. 18, 2000.

"About CDMA Digital Phones," http://www.kyocera-wireless.com/cdma/qa.html, 2 pages, downloaded Sep. 18, 2000.

"CDMA Technology, What is CDMA (Code Division Multiple Acess)?," http://www.cdg.org/tech/tech.html, 2 pages, downloaded Sep. 18, 2000.

"CDMA Terminology and Definitions,"http://www.cdg.org/tech/cdma term.html, 1 page, downloaded Sep. 18, 2000.

"What is CDMA (Code Division Multiple Access)!," http://www.cdg.org/tech/about cdma.html, 3 pages, downloaded Sep. 18, 2000.

About CDMA Technology Principles of CDMA, http://www.cdg.org/tech/a ross/Principles.html, 2 pages, downloaded Sep. 18, 2000.

"About CDMA Technology, Introduction to CDMA," http://www.cdg.org//tech/a ross/Intro.html, 2 pages, downloaded Sep. 18, 2000.

"About CDMA Technology, The CDMA Revolution," http://www.cdg.org/tech/a ross/CDMARevolution.html, 6 pages, downloaded Sep. 18, 2000.

"About CDMA Technology, Frequency Plans," http://www.cdg.org/tech/a ross/FreqPlan.html, 2 pages downloaded Sep. 18, 2000.

"About CDMA Technology, Commercialization of CDMA," http://www.cdg.org/tech/a ross/Commercial.html, 1 page, downloaded Sep. 18, 2000.

"About CDMA Technology, Spreading Bandwidth," http://www.cdg.org/techa ross/SpreadingBW.html, 1 page, downloaded Sep. 18, 2000.

"About CDMA Technology, Spreading Codes," http://www.cdg.org/techa ross/Spreading.html, 1 page, downloaded Sep. 18, 2000.

"About CDMA Technology, Handoff," http://www.cdg.org/techa ross/Handoff.html, 4 pages, downloaded Sep. 18, 2000.

"About CDMA Technology, Power Control," http://www.cdg.org/tech/a ross/PowerControl.html, 3 pages, downloaded Sep. 18, 2000.

"About CDMA Technology, Forward CDMA Channel," http:www.cdg.org/tech/ a ross/Forward,html, 4 pages, downloaded Sep. 18, 2000.

"About CDMA Technology, Multiple Access Wireless Communications," http://www.cdg.org/tech/a ross/MultipleAccess.html, 3 pages, downloaded Sep. 18, 2000.

About CDMA Technology, Reverse CDMA Channel, http://www.cdg.org/tech/a ross/Reverse.html, 4 pages, downloaded Sep. 18, 2000.

"About CDMA Technology, CDMA Glossary A–F," http://www.cdg.org/tech/a ross/DefAtoF.html, 7 pages, downloaded Sep. 18, 2000.

"About CDMA Technology, CDMA Glossary G–M," http://www.cdg.org/tech/a ross/DefGtoM.html, 4 pages, downloaded Sep. 18, 2000.

"About CDMA Technology, CDMA Glossary N–S," http://www.cdg.org/tech/a ross/DefNtoS.html, 5 pages, downloaded Sep. 18, 2000.

"About CDMA Technology, CDMA Glossary T–Z," http://www.cdg.org/tech/a ross/DefTtoZ.html. 2 pages, downloaded Sep. 18, 2000.

"Method and Principle of Uplink Synchronization," TSG–RAN Working Group 1 (Radio) meeting#5, 6 pages, Jun. 1999.

"Overview of Uplink Synchronous Transmission Scheme (USTS)," TSG–RAN Working Group 2 meeting #15, 5 pages, Aug., 2000.

"Feasibility study on USTS," TSG–RAN Working Group 1 meeting #16, 6 pages, Oct., 2000.

Povey, G.J.R.: "Frequency and Time Division Duplex Techniques for CDMA Cellular Radio", Spread Spectrum Techniques and Applications, 1994. IEEE ISSSTA '94., IEEE Third International Symposium on Oulu, Finland Jul. 4–6, 1994, New York, NY, USA, IEEE, Jul. 4, 1994, pp. 309–313, XP010129669.

Sunay, M.O., et al.: "A Dynamic Channel Allocation Based TDD DS CDMA Residential Indoor System", 1997 IEEE 6th. International Conference on Universal Personal Communications Record. San Diego, Oct. 12–16, 1997, IEEE International Conference on Universal Personal Communications, New York, IEEE, USA, vol. 2 Conf. 6, Oct. 12, 1997, pp. 228–234 XP010248703.

Haas, H., et al.: "Outage Probability of CDMA–FDD Micro Cells in a CDMA–FDD Environment", Personal, Indoor and Mobile Radio Communications, 1998. The Ninth IEEE International Symposium on Boston, MA, USA Sep. 8–11, 1998, New York, NY, US, IEEE, USA. Sep. 8, 1998, pp. 94–98, XP010314770, Chenhong Huang: "An Analysis of CDMA 3G Wireless Communications Standards",Vehicular Technology Conference, 1999 IEEE 49th Houston, TX, USA May 16–20, 1999, Piscataway, NJ, USA IEEE, USA, May 16, 1999, pp. 342–345, XP010341901.

* cited by examiner

SYSTEM AND METHOD FOR CODE DIVISION MULTIPLE ACCESS COMMUNICATION IN A WIRELESS COMMUNICATION ENVIRONMENT

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a system and method for wireless communication for a reverse communication link (wireless device to base station), and in particular, to a system and method for wireless communication in a multi-carrier environment which can accommodate, and switch between, asynchronous operation and synchronous operation based on one or more operational factors.

BACKGROUND OF THE INVENTION

The success of wireless communications has increased demand for new types of wireless devices as well as for an increase in quantity of these devices. While wireless devices suitable for communication via cell-based systems such as code division multiple access (CDMA) and orthogonal frequency division multiplexed (OFDM) systems were traditionally relegated to telephones, such is no longer the case.

Rather, wireless communication devices also include personal digital assistants (PDAs), pagers, network appliances, laptop and desktop computers, etc. These devices and their users can be divided into three categories, namely, mobile, nomadic and stationary. Mobile devices refer to devices which are moving during use, such as telephones and personal digital assistants when used while walking, riding in a vehicle, and the like. Stationary devices refer to devices which are typically not prone to movement, even during repeated use. An example of a stationary device is a personal tower computer equipped with wireless communication capability. Nomadic devices refer to devices which can move from place to place but are typically stationary during use. Although typically stationary during use, a nomadic device can also be mobile during use. An example of a nomadic device is a laptop computer equipped with wireless communication capability in which the laptop computer is used in an office and moved to another location for subsequent use. According to this example, the laptop computer can be used while being moved, such as while riding in a train or car.

Current wireless communication infrastructures also include one or more base stations, used to communicate with the wireless devices, arranged in a network with access being provided to external services, for example, Internet access. Demand is such that the infrastructure exists in the form of increasing base station and antenna densities, as well as increasing processing loads placed on base station communication equipment as devices are added to the system.

Current and proposed wireless communication environments such as the Third Generation Partnership Project (3GPP) propose different designs for the different categories of devices described above. The device category becomes particularly important when determining the designs for the reverse link (device to base station). In particular, CDMA environments such as the 3GPP propose two types of reverse link designs, namely, synchronous code division multiple access (SCDMA) and asynchronous code division multiple access (ACDMA) with devices operating on one or the other type of link. However, the 3GPP does not address the complementary use of SCDMA codes and ACDMA codes on the reverse link. Further, neither the 3GPP nor the CDMA2000 communication environment address the complementary use of SCDMA codes and ACMDA codes based on the type of device, i.e. stationary or mobile.

SCDMA refers to synchronous orthogonal transmission in which each communication channel is identified by a different orthogonal spreading sequence, and synchronization among channels is achieved by ensuring that transmissions arrive at each receiver at substantially the same time. In contrast, an ACDMA link is a link in which transmissions arrive at the receivers at different times. ACDMA links result in a loss in the orthogonality of the system and an increase in interference within each base station's coverage area, i.e. cell, as compared with a SCDMA link.

As a result of the orthogonality of SCDMA transmission, an orthogonality gain on the order of 3dB or more with respect to the carrier to interference ratio required to achieve a given bit error rate (BER) over an equivalent ACDMA link is realized. The SCDMA arrangement is desirable over ACDMA operation because the capacity of the carrier channel is therefore increased when all devices are operating synchronously. However, the presence of devices operating out of time alignment, i.e. asynchronously with the other devices, increases interference in the channel, thereby decreasing capacity and performance in the channel.

As discussed above, SCDMA links require time alignment among the receivers and also require the use of orthogonal-spreading codes such as Walsh-spreading codes. Because the number of codes in an orthogonal-spreading code environment are limited as compared with non-orthogonal codes such as those used in ACDMA links, the number of devices which can simultaneously be used with a particular carrier within a cell are limited. This limitation makes the code assignment aspect particularly important and therefore increases system complexity.

An integral feature of CDMA systems is the concept of soft handover. Soft handover refers to the simultaneous communication between a wireless device and multiple base stations such that communication is transferred from one base station to another in a make-before-break fashion, i.e., communication is established with the new base station prior to breaking the communication link with the current base station. A device using an SCDMA code can maintain soft handoff with other base stations, however, these other base stations see the SCDMA code as an ordinary pseudo-noise code. Therefore, devices in soft handoff increase the amount of interference experienced by the SCDMA devices within the cell.

Because accurate time alignment, e.g. within one-eighth or one-quarter of a chip, is required in a high-capacity SCDMA system, devices in the mobile category described above have difficulty maintaining synchronous operation on the reverse link due to device movement with respect to other devices and the base station. Furthermore, the ability to maintain synchronization is also impacted by the variability in fading and interference, even for stationary uses. This adverse effect is particularly prevalent in wide-band (i.e. 5 MHz and up) systems due to the very fast chip rates involved. As a result, systems such as those conforming to 3GPP standards propose separate designs for low and high mobility devices.

The category in which a device operates may change, for example, when a mobile device user stops moving for a prolonged period. Current systems do not, however, support the switch between one category and another, i.e., ACDMA to/from SCDMA reverse link operation. As such, a mobile device which becomes stationary may be relegated to less efficient and lower capacity asynchronous operation when, in fact, the device could make efficient use of an SCDMA reverse link. Similarly, a nomadic device which changes from stationary to mobile operation may adversely impact the performance of an originally assigned SCDMA reverse link due to its imposition of increased channel interference due to the inability to maintain orthogonality.

It is therefore desirable to have a wireless communication system which allows a device to operate in an SCDMA reverse link mode or an ACDMA reverse link mode depending on the particular profile of the wireless device during operation.

Further, because current wireless communication systems do not facilitate switching from ACDMA to SCDMA operation and vice-versa during a communication session, these current systems do not monitor the operational mode of the device to detect operational category changes of the device, e.g. the ability of the device to maintain synchronization (degree of unit mobility). Also, current systems are not optimized for situations which restrict the use of an SCDMA code.

It is therefore desirable to have a system which monitors the operational characteristics, i.e. category of operation, of the devices to detect a change therein. This is particularly the case in multi-carrier wide-band operation in which a system provider allocates their wide-band frequency spectrum into multiple discrete carriers such that each carrier supports a particular type of operation, for example SCDMA or ACDMA.

It is also desirable to have a CDMA system which reduces interference to devices operating in an SCDMA mode while offering the use of unlimited ACDMA codes for mobile users to ensure optimal system operation.

Although wideband multi-carrier CDMA systems have been proposed in which the wideband carrier is divided into multiple discrete carriers, for example, a 5 MHz system supporting three 1.25 MHz carriers, these systems do not dedicate particular carriers to particular services, for example, SCDMA for one carrier and ACDMA for a different carrier on the same system. It is therefore also desirable to have a CDMA system which dedicates carriers to particular services in a manner which optimizes the use of these services and which allows the device to switch between services as needed.

SUMMARY OF THE INVENTION

The present invention advantageously provides a system and method which allows a device and a base station wirelessly communicate with each other using a carrier and reverse link coding technique optimized based on the operational profile of the device. For example, devices which are stationary can use an SCDMA link, while mobile devices can use an ACDMA link. Further, the present invention is arranged such that the synchronization of the device and base station is monitored and, if a change in mobility is detected, such as stationary to mobile operation, communication is switched from the current carrier to a carrier employing a link whose CDMA code is suitable to the changed mobility state.

As an aspect of the present invention, a method of using a code division multiple access carrier for wireless communication between a device and a base station is provided in which an operational profile of the device is determined. The operational profile includes a degree of unit mobility. A first carrier for wireless code division multiple access communication from the device to the base station is selected based on the determined operational profile of the device. A wireless communication link between the device and the base station is established using the first carrier.

As still another aspect, the present invention provides device using at least one code division multiple access carrier for wireless communication with a base station, in which the device has a transmitter and a central processing unit in operative communication with the transmitter. The transmitter transmits a first signal to the base station using a first designated carrier. The central processing unit determines an operational profile, selects the first designated carrier based on the determined operational profile and establishes a wireless communication link with the base station using the first designated carrier. The operational profile includes a degree of unit mobility.

As yet another aspect, the present invention provides a wireless signal for communication between a device and a base station in which the wireless signal has a plurality of carriers. Each of the plurality of carriers provides a synchronous code division multiple access communication link or an asynchronous code division multiple access communication link. Each carrier providing the synchronous code division multiple access communication link is used by a stationary wireless device and each carrier providing the asynchronous code division multiple access communication link is used by a mobile wireless device.

According to still another aspect, the present invention provides a base station which uses at least one code division multiple access carrier for receiving wireless communication from a device in which the base station has a receiver and a central processing unit in operative communication with the receiver. The central processing unit determines an operational profile of the device, selects a first designated carrier based on the determined operational profile and establishes a wireless communication link with the device using the first designated carrier. The operational profile includes a degree of unit mobility. The receiver receives a first signal from the device using the first designated carrier.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
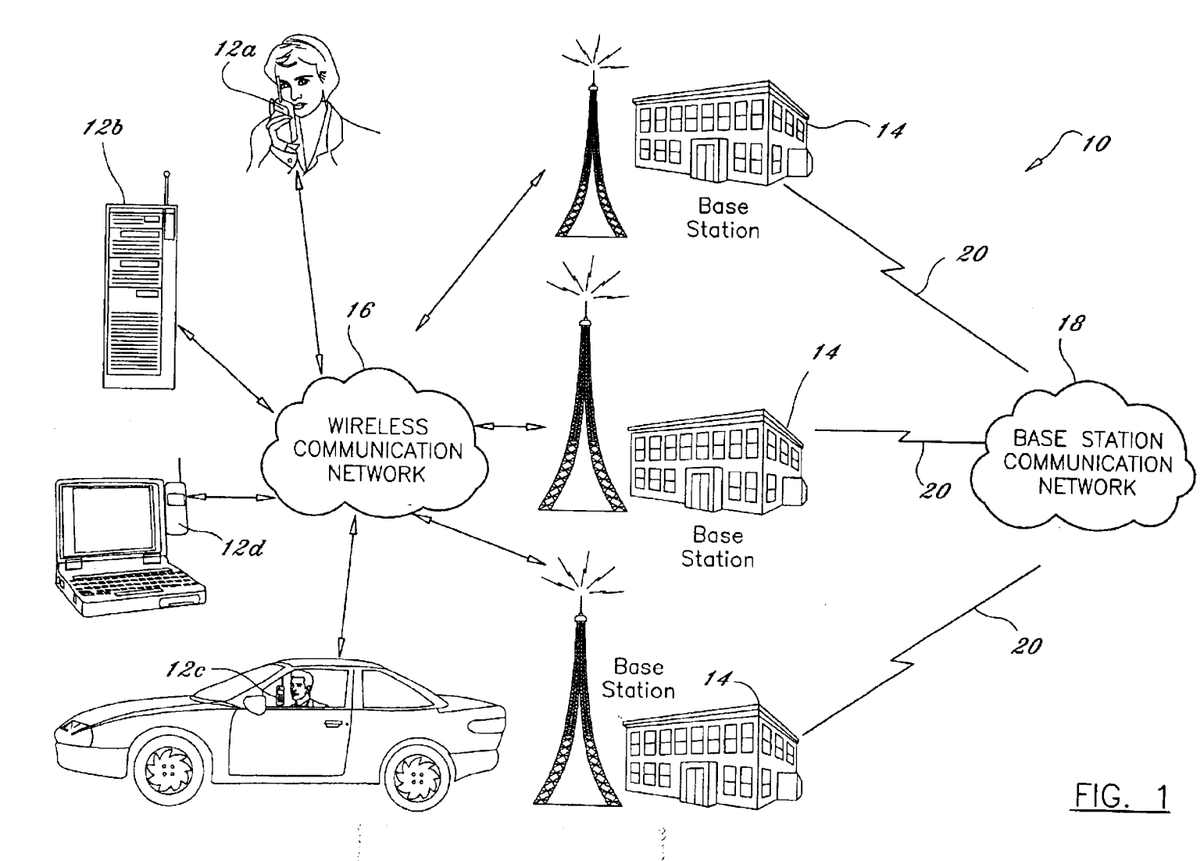
FIG. 1 is a block diagram of a communication system constructed in accordance with the principles of the present invention.

Referring now to the drawing figures in which like reference designators refer to like elements, there is shown in FIG. 1 a communication system constructed in accordance with the principles of the present invention and designated generally as 10. Communication system 10 preferably includes one or more wireless devices 12 (shown as handheld wireless device 12a, wireless tower computer 12b, wireless vehicular mounted phone 12c, and wireless laptop computer 12d) in communication with one or more base stations 14 via wireless communication network 16. Devices 12 and base stations 14 are commonly referred to together herein as "units".

Handheld wireless device 12a is an example of a mobile device, wireless tower 12b is an example of a stationary device, vehicular mounted wireless phone 12c is an example of a mobile device, and wireless laptop computer 12d is an example of a nomadic device. Of course, handheld wireless device 12a and vehicular mounted wireless phone 12c may also be considered nomadic devices because they are operable when the user (or vehicle) is stationary as well as when the user (or vehicle) is moving. However, devices 12a and 12c are considered mobile as discussed herein, because these devices are typically in motion when being used.

Communication system 10 is also comprised of base station communication network 18 coupled to base stations 14 via communication links 20. Communication links 20 and communication network 18 can undertake any arrangement used to facilitate communication between base stations 14 themselves and/or external services such as Internet access, news and stock quotation services and the like (not shown). Arrangements for communication network 18 and communication links 20 such as those used to support digital wireless networks are known. For example, communication links 20 can be wireless or wired links such as multi-megabit per second links. Communication network 18 is comprised of digital switches, routers and other known digital communication devices.

Devices 12 are any wireless communication devices, and are not limited solely to the four types of devices shown in FIG. 1. Each of devices 12 includes a wireless communication section, described below in detail, which receives and transmits wireless communication signals to and from base stations 14.

Figure 2:
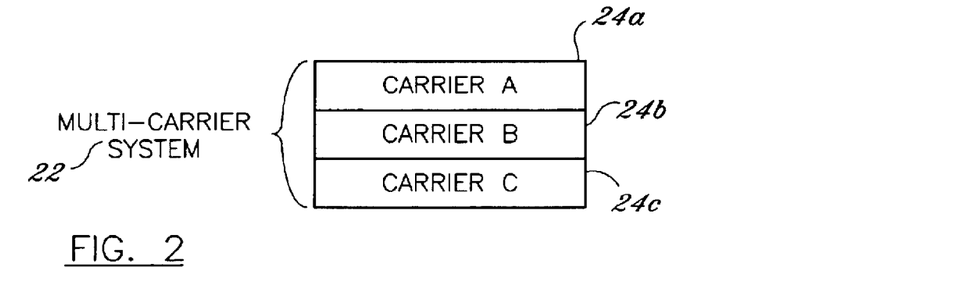
FIG. 2 is a diagram of an arrangement of a multi-carrier system constructed in accordance with the principles of the present invention.

Wireless communication network 16 is preferably a wideband system. As used herein, the term "wideband" refers to systems having a minimum of a 5 MHz bandwidth. The wideband system is preferably arranged as a multi-carrier system in which wireless communication links between devices 12 and/or base stations 14 are established using one of the carriers in the multi-carrier system. FIG. 2 shows a diagram of an arrangement of a multi-carrier system for reverse links constructed in accordance with the principles of the present invention. As shown in FIG. 2, multi-carrier system 22 is comprised of a plurality of carriers, namely, carrier A 24a, carrier B 24b and carrier C 24c. Although FIG. 2 shows adjacent carriers, the present invention is not limited to such.

For example, multi-carrier system 22 can be arranged as a 5 MHz system in which each of carriers A–C (24a, 24b and 24c) are 1.25 MHz carrier channels. As discussed below in detail, individual carriers are used to support particular link arrangements suited to the particular characteristics to the devices using the carrier, for example, ACDMA and SCDMA wireless communication links. As such, and in accordance with the principles of the present invention, carrier A 24a can be used to support an ACDMA reverse link while carrier B 24b can be used to support an SCDMA reverse link.

It is contemplated that wireless communication network 16 can be included as part of any wireless communication system, including a wireless highspeed fixed access data system employing a wireless Highspeed Data Protocol (HDP) or a wireless Digital Subscriber Line (DSL) signal. Further, it is contemplated that wireless communication network 16 can be included as part of a wireless local area network. Standardized protocols for providing a wireless highspeed data protocol, a wireless DSL signal and a wireless local area network signal are known. As used herein, the term "protocol" refers to the arrangement of data within a data packet, such as packet headers, footers, packet size, etc.

Figure 3:
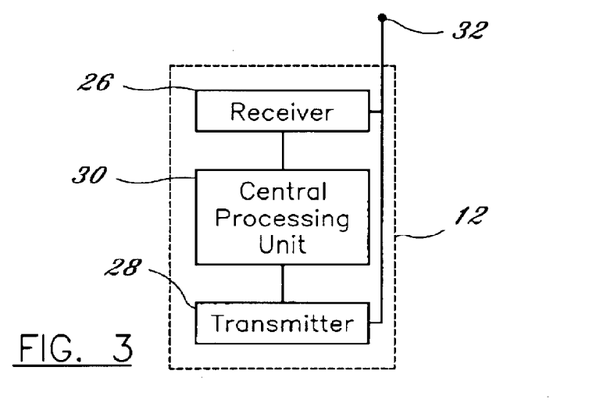
FIG. 3 is a block diagram of the wireless communication section of a device constructed in accordance with the principles of the present invention.

FIG. 3 is a block diagram of the wireless communication portion of a device 12 constructed in accordance with the principles of the present invention. As shown in FIG. 3, the wireless communication portion of device 12 preferably includes a device receiver 26 and a device transmitter 28, each of which are coupled to and controlled by device central processing unit 30. Device receiver 26 and device transmitter 28 are coupled to antenna 32 for respectively receiving and transmitting signals to and from other units.

Device receiver 26 is preferably arranged to receive signals transmitted by base station 14. Device transmitter 28 is preferably arranged to transmit CDMA spread spectrum signals, such as ACDMA and SCDMA spread spectrum signals, to base station 14 via antenna 32. Device central processing unit 30 is any central processing unit capable of executing the device functions described in detail below.

In accordance with the present invention, device central processing unit 30 is preferably arranged to include or have access to sufficient memory (not shown) required to store data, buffer, transmit and receive data and programmatic code to perform its designated, below-described functions. Further, device central processing unit 30 is preferably arranged to cause device 12 to switch between carriers in a multi-carrier system. This is the case regardless of whether device 12 determines that the carrier switch is necessary or whether the carrier switch is executed based on an instruction received from another unit such as base station 14.

Devices 12 are operable to communicate with base station 14 using SCDMA or ACDMA communication on the reverse link, depending upon the operational profile of the device, and are operable to switch between ACDMA and SCDMA communication links using suitable carrier handoff protocols typically used to change carriers in multi-carrier wireless communications.

Figure 4:
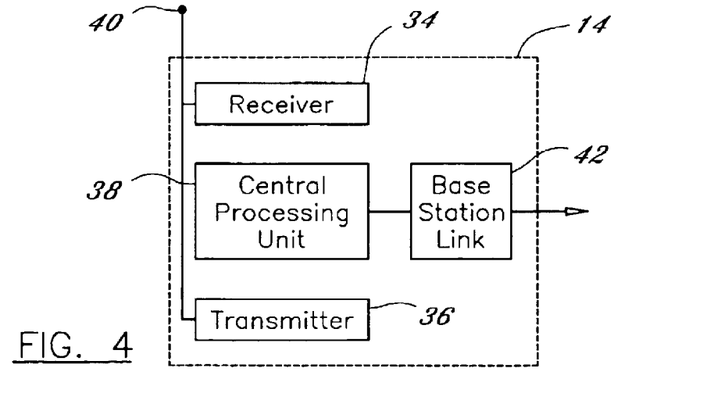
FIG. 4 is a block diagram of the wireless communication section of a base station constructed in accordance with the principles of the present invention.

FIG. 4 is a block diagram of a base station 14 constructed in accordance with the principles of the present invention. As shown in FIG. 4, base station 14 is preferably comprised of base station receiver 34 and base station transmitter 36, each of which are coupled to and controlled by base station central processing unit 38. Base station 14 is also preferably comprised of base station antenna subsystem 40 which is coupled to base station receiver 34 and base station transmitter 36 for receiving signals transmitted by device 12 and transmitting signals to device 12, respectively.

Base station 14 preferably also includes base station link 42 which provides the necessary interface hardware and/or software to couple base station 14 to communication network 18 via communication link 20. This interface hardware takes the form of plugs, jacks and electronic circuit elements. The interface software, when executed, provides the drivers and other functions necessary to receive data from communication network 18 and transmit data to communication network 18.

Base station receiver 34 is preferably arranged to receive wireless spread spectrum CDMA signals, such as ACDMA and SCDMA signals, from a plurality of devices 12. Further, base stations 14 transmit time alignment commands to devices 12 to instruct devices 12 to adjust their transmit timing to maintain synchronous alignment during transmission. Techniques for determining and transmitting time alignment commands in a wireless communication environment are known.

Base station central processing unit 38 preferably includes or has access to a storage unit which contains the programmatic instructions needed to perform the below-described functions. Further, the storage unit is preferably arranged to store data corresponding to in-progress communication with devices 12, provide buffering of data transmitted and/or received to/from devices 12 and communication network 18, and the like. In general, any central processing unit which provides the described functions of base station 14 can be used.

In the case of both device 12 and base station 14, each of the above-described elements of the respective devices are arranged with a communication structure which facilitates communication among the respective elements. Further, it is contemplated that any combination of the elements of each respective device 12 and base station 14, such as the receivers, transmitters and central processing units, can be provided as a single semi-conductor integrated circuit.

In accordance with the present invention, each base station 14 is equipped with the ability to communicate with devices 12 using one or a combination of a plurality of carriers in a multi-carrier environment. Further, each base station 14 operates to determine whether to communicate with devices 12 via an ACDMA link or an SCDMA link, in particular the reverse link, based on one or more operational profile characteristics. These characteristics include whether the device is mobile or stationary and whether there are sufficient orthogonal spreading codes available for SCDMA operation.

Figure 5:
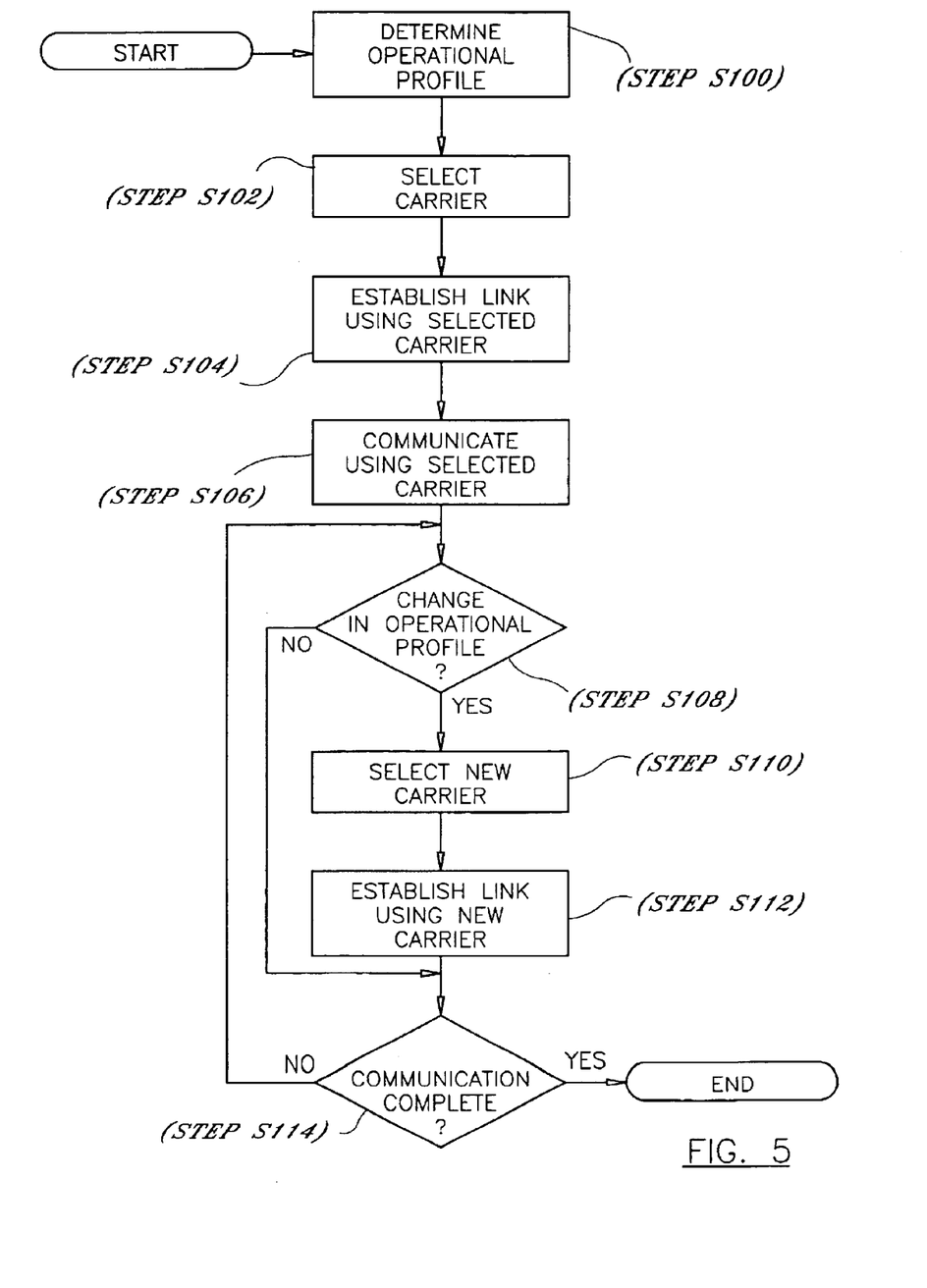
FIG. 5 is a flowchart of the overall operation of the system and the communication units.

The overall operation of system 10 and the communication units is explained with reference to FIG. 5 and is described with reference to communication between a device 12 and a base station 14.

Initially, the operational profile of device 12 is determined (step S100), preferably by base station 14. The operational profile includes a characteristic indicating the degree of mobility of the device. The degree of mobility can take the form of a binary determination, such as stationary or mobile, or the specific degree of mobility can be determined and included as part of the operational profile. Techniques for determining the specific degree of mobility by estimating the velocity of a mobile device 12 based on variations in the timing of the received signal at base station 14 are known. Initially, the access channel or a signaling channel on either an SCDMA carrier or an ACDMA carrier can be used for estimating the velocity. Base stations 14 estimate the degree of mobility of device 12 by tracking the frequency of time alignment changes transmitted to a device 12. As such, the degree of mobility can be set as stationary if mobility is less than a predetermined value, or as mobile if mobility is greater than a predetermined value. The predetermined value is preferably based on the chip rate and the resultant ability of base station 14 to maintain SCDMA links with devices 12.

It is also contemplated that device 12 can determine its own degree of mobility and provide this determination to base station 14. For example, device 12 may be equipped with a tracking system such as a global positioning receiver which determines the change in position of device 12 over time, i.e. velocity.

A carrier for the communication link between device 12 and base station 14 is selected based, at least in part, on the operational profile (step S102). Preferably, a carrier is selected by base station 14 from among carriers in a multi-carrier environment which are dedicated to SCDMA spread spectrum communication links and ACDMA spread spectrum communication links. It is contemplated that device 12 can also select the carrier. The carrier selection process is discussed in detail below.

A communication link is established using the selected carrier (step S104) and data communication between device 12 and base station 14 commenced using the selected carrier (step S106). Communication links established as ACDMA communication links proceed using those facilities provided by the system for ACDMA communication. For example, a system supporting mobile devices on a carrier supporting ACDMA communication links may employ "soft handover" techniques between a mobile device 12, such as wireless vehicular mounted phone 12c, and multiple base stations 14.

Data communication continues for the duration of the communication session, i.e., call, data transfer, etc., until the communication session is terminated or a change in the operational profile of device 12 is detected (step S108).

The change in the operational profile of device 12 is detected in a fashion similar to the initial operational profile determined as described with respect to step S100 above. In particular, base stations 14 can determine the degree of mobility of devices 12 and/or devices 12 can determine their own degree of mobility. For example, a nomadic device such as laptop 12d may have established communication based on its initial operational profile reflecting a stationary status. Laptop 12d may begin to move, thereby affecting a change in its operational status from stationary to mobile. Such is the case, for example, when laptop 12d is initially operated on a non-moving train or car which subsequently begins moving.

Upon detection of a change in the operational profile (step S108), a potentially new carrier is selected based on the change (step S110). The new carrier is preferably a carrier within the multi-carrier wideband communication environment. As discussed in detail below, a change in the operational profile of a device does not necessarily result in the selection of a new carrier. Such is the case, for example, where there are no available spreading codes in the reverse SCDMA link supported by the new carrier. Although base station 14 preferably selects the new carrier, it is contemplated that the device 12 can select the new carrier and provide the new carrier information to the base station 14.

As with step S104, a communication link is established using the new carrier (step S112). Techniques for switching between wireless carrier frequencies without terminating a communication session are known. Monitoring for a change in operational profile for subsequent new carrier selection in steps S108–S112 continues until the communication session is complete (step S114).

Figure 6:
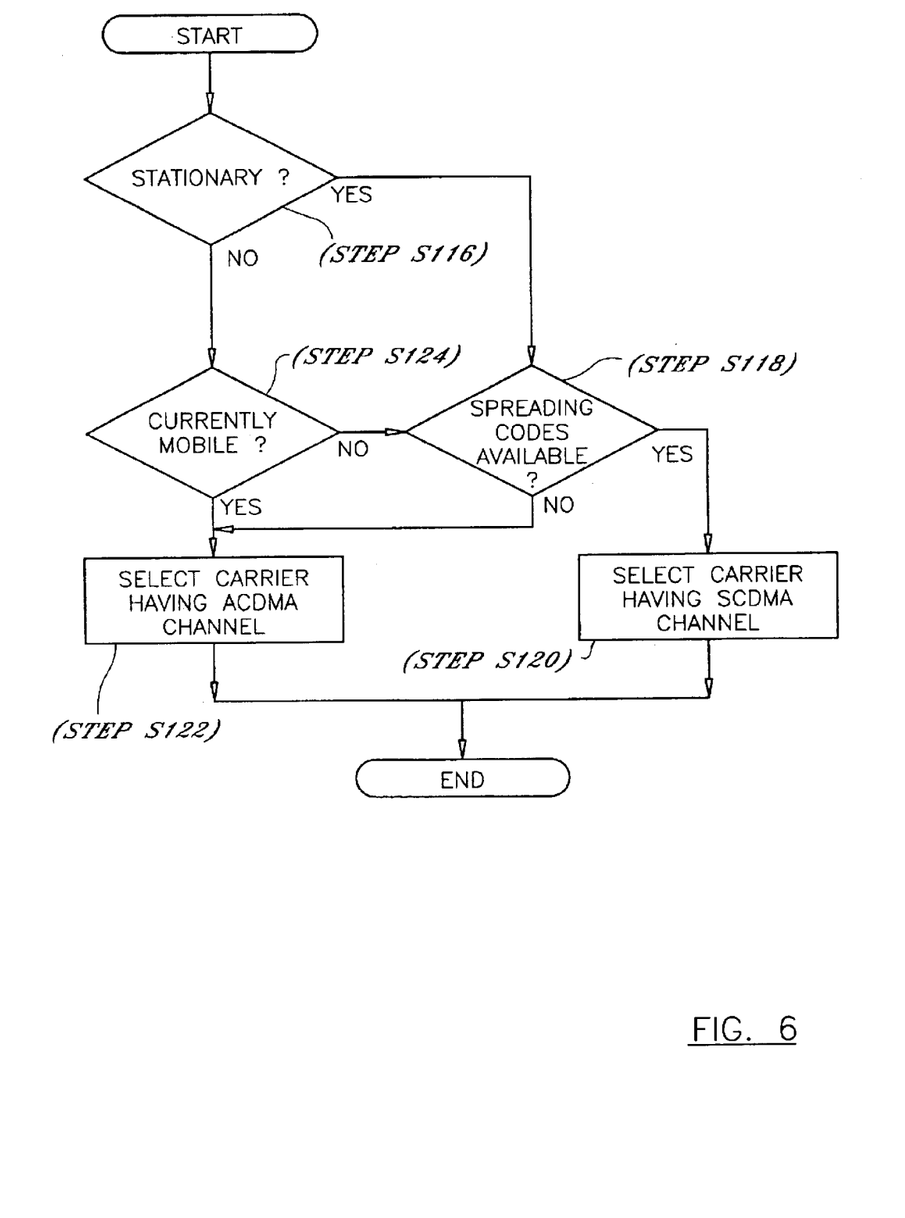
FIG. 6 is a flowchart of the new carrier selection process.

The new carrier selection process of steps S102 and S110 is described with reference to the flow chart in FIG. 6. The operational profile is evaluated to determine whether the device is stationary or moving at a velocity faster than a predetermined amount. If a device is stationary (step S116)

and spreading codes are available on one or more carriers supporting SCDMA (step S118), for example orthogonal Walsh spreading codes, a carrier having an SCDMA channel is selected (step S120). Such is the case with stationary wireless devices such as wireless tower computer 12b. If no spreading codes are available, a carrier having an ACDMA channel is used (step S122).

Similarly, a carrier having an SCDMA channel is selected for a device which is generally not stationary (step S116) but which is not currently mobile (step S124) as long as spreading codes are available (step S118). A carrier having an ACDMA channel is selected if spreading codes are not available.

Devices which are categorized as currently mobile (step S124), i.e., not stationary or having a degree of mobility more than the predetermined amount, such as wireless telephone 12a and vehicular mounted wireless device 12c, use carriers having an ACDMA channel (step S122).

It is noted that the operational profile preferably indicates whether the device is stationary or mobile. It is contemplated, however, that the operational profile can indicate that a device is a nomadic device by storing a mobility history of the device. This mobility history is used to predict an initial operational characteristic of the device as stationary or mobile. As discussed above, devices which are typically stationary in use but which are suitable for mobile use are typically thought of as nomadic devices.

A device 12 using an SCDMA code can maintain soft handoff with base stations other than its primary base station 14, however, these other base stations 14 receive the SCDMA code as an ordinary pseudo-noise code generated by the combination of the orthogonal code and the "cover" scrambling code specific to each base station.

For example, device 12 associated with a base station 14 (referred to herein as base station A) as the primary link has code C1 from the SCDMA OVSF(orthogonal variable spreading factor) tree or orthogonal code set, and a scrambling code S1 associated with base station A. When device 12 enters soft handoff with another base station 14 which has its own scrambling code S2, (referred to herein as base station B), the transmission from device 12 to base station A uses an SCDMA mode while the same transmission received at base station B is experienced as just another pseudo-noise code. Thus, a device 12 in SCDMA mode can maintain soft handoff with other base stations but cannot be operating in an SCDMA mode with those base stations unless those base stations have the same scrambling code (this arrangement might be applicable for a sectored cell site). Thus, SCDMA mode devices in soft handoff will appear as interference to the SCDMA devices whose primary base station is base station B, since they are operating on the same carrier frequency.

Devices 12 in soft handoff can first be migrated to an ACDMA carrier because these devices' codes will be seen as pseudo-noise codes by the non-primary base stations and may thus become a source of interference to the in-cell (non-soft-handoff) SCDMA code users in these base stations.

The present invention advantageously provides a multi-carrier environment in which communication links, especially the reverse link, are established and maintained such that the link type selected is the optimal link for the device based on the operational profile of the device. Further, the type of communication link is changed when the operational profile changes in a manner which necessitates a change in link type, for example, a nomadic device using an SCDMA link begins moving such that ACDMA operation becomes preferable. As another example, the link may be changed when a device using an SCDMA code is in need of entering soft handoff.

The present invention provides a method for deriving the synchronization of device 12 when in soft handoff by measuring the received signal at secondary base stations 14. In the event that device 12 is handed off to one of the secondary base stations 14 (due to its pilot becoming the strongest available), the synchronization information is readily available to enable device 12 to instantaneously benefit from the use of the SCDMA code.

The present invention therefore advantageously provides a multi-carrier environment which supports both low and high mobility devices while accommodating devices whose mobility changes during use. Dividing the available bandwidth between a few subcarriers reduces the chip rate used per carrier. A lower chip rate makes it easier to establish and maintain the time alignment required for SCDMA operation. Devices which are able to effectively operate using an SCDMA carrier, i.e. low mobility devices, are isolated from the harmful effects of those devices which cannot maintain time alignment, such as high mobility devices. Recall that the strict time alignment requirements for SCDMA operation and the absence of synchronization within all secondary base stations in soft handoff reduce the benefit of SCDMA operation.

Because the present invention is preferably provided as a multi-carrier wideband system, the individual carriers can be configured and re-configured to provide the optimal carrier type distribution suitable for the system environment. For example, a 5 MHz multi-carrier system supporting three 1.25 MHz carriers can be arranged such that the ratio of SCDMA carriers to ACDMA carriers is suited to the system and its users. For example, if the system supports more stationary devices than mobile devices such as may occur in an office park, the provider of the system may allocate two carriers to SCDMA operation and one carrier to ACDMA operation. If the distribution of stationary to mobile devices changes, the provider can re-configure the system to provide more ACDMA carriers and fewer SCDMA carriers or vice-versa as necessary. In addition, the flexibility of the present invention allows the provider to optimize the carrier assignment ratio on a system-wide basis or on a per cell/section basis depending on the needs of the provider and the demand placed on the system.

The present invention addresses the complementary use of SCDMA codes and conventional pseudo-noise ACDMA codes on the reverse link of wireless communications systems. As noted above, SCDMA codes differ from ACDMA codes in that SCDMA codes are orthogonal codes which are tolerant only of minor deviations in chip timing alignment, and therefore require reasonably accurate chip synchronization. When applied to the reverse link for devices distributed over the area of a cell/sector, SCDMA codes enable the minimization of intra-cell interference and therefore result in increased capacity. However, in the event that synchronization cannot be maintained within the designed tolerance, the performance of SCDMA codes degrades gracefully to that of ACDMA codes. Additionally, when it is not possible to maintain synchronization, it is advantageous to use ACDMA codes because ACDMA codes are not limited in quantity as described above with respect to SCDMA codes. In that regard, the present invention provides two access modes for use on the reverse link in which the mode best suited to the operational profile of the device is selected, thereby maximizing the benefits accruing from both the ACDMA and SCDMA access modes. The result is an increase in cell and system capacity.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of using a code division multiple access carrier for wireless communication between a device and a base station, comprising:
   determining an operational profile of the device, the operational profile including a degree of unit mobility;
   selecting a first carrier for wireless code division multiple access communication from the device to the base station based on the determined operational profile of the device;
   establishing a wireless communication link between the device and the base station using the first carrier;
   detecting a change in the operational profile of the device;
   selecting a second carrier for wireless code division multiple access communication from the device to the base station based on the change in the operational profile of the device; and
   establishing a wireless communication link from the device to the base station using the second carrier,
   wherein one of the first carrier and the second carrier provides an asynchronous code division multiple access communication link and the other of the first carrier and the second carrier provides a synchronous code division multiple access communication link.

2. The method according to claim 1, wherein the selection of the second carrier is further based on a quantity of available synchronous code division multiple access spreading codes.

3. The method according to claim 2, wherein the selected second carrier corresponds to the asynchronous code division multiple access link if the quantity of available synchronous code division multiple access spreading codes is less than a predetermined quantity.

4. The method according to claim 1, wherein the degree of mobility corresponds to one of mobile and stationary, and wherein the second carrier provides an asynchronous code division multiple access communication link if the degree of mobility corresponds to mobile and the second carrier provides a synchronous code division multiple access communication link if the degree of mobility corresponds to stationary.

5. The method according to claim 4, wherein the degree of mobility is stationary if a velocity of the device is less than a predetermined amount.

6. The method according to claim 1, wherein a history of the degree of mobility of the device is stored by one of the device and the base station.

7. A method of using a code division multiple access carrier for wireless communication between a device and a base station, comprising:
   determining an operational profile of the device, the operational profile including a degree of unit mobility;
   selecting a first carrier for wireless code division multiple access communication from the device to the base station based on the determined operational profile of the device; and
   establishing a wireless communication link between the device and the base station using the first carrier, wherein the degree of mobility corresponds to one of mobile and stationary, and wherein the first carrier provides an asynchronous code division multiple access communication link if the degree of mobility corresponds to mobile and the first carrier provides a synchronous code division multiple access communication link if the degree of mobility corresponds to stationary.

8. The method according to claim 7, wherein the degree of mobility is stationary if a velocity of the device is less than a predetermined amount.

9. A method of using a code division multiple access carrier for wireless communication between a device and a base station, comprising:
   determining an operational profile of the device, the operational profile including a degree of unit mobility, the degree of unit mobility being determined by the base station;
   selecting a first carrier for wireless code division multiple access communication from the device to the base station based on the determined operational profile of the device; and
   establishing a wireless communication link between the device and the base station using the first carrier;
   wherein the first carrier provides one of an asynchronous code division multiple access communication link and a synchronous code multiple access communication link, and the second carrier provides the other of the asynchronous code division multiple access communication link and the synchronous code division multiple access communication link.

10. The method according to claim 9, wherein the degree of mobility corresponds to one of mobile and stationary.

11. The method according to claim 9, wherein a history of the degree of mobility of the device is stored by one of the device and the base station.

12. A device using at least one code division multiple access carrier for wireless communication with a first base station, the device comprising:
    a transmitter, the transmitter transmitting a first signal to the first base station using a first designated carrier; and
    a central processing unit in operative communication with the transmitter, the central processing unit:
       determining an operational profile, the operational profile including a degree of unit mobility;
       selecting the first designated carrier based on the determined operational profile; and
       establishing a wireless communication link with the first base station using the first designated carrier;
    wherein the first designated carrier corresponds to one of an asynchronous code division multiple access communication link and a synchronous code division multiple access communication link.

13. The device according to claim 12, wherein selection of the first designated carrier is further based on a quantity of available synchronous code division multiple access spreading codes.

14. The device according to claim 13, wherein the first designated carrier corresponds to the asynchronous code division multiple access link if the quantity of available synchronous code division multiple access spreading codes is less than a predetermined quantity.

15. The device according to claim 12, wherein the central processing unit further uses the transmitter to communicate with a second base station, wherein the second base station also provides the first designated carrier, the first designated carrier provided by the second base station corresponding to the other of the asynchronous code division multiple access communication link and the synchronous code division multiple access communication link provided by the first base station.

16. The device according to claim 12, further comprising a receiver, the receiver receiving a second signal from the base station using a second designated carrier, the receiver being in operative communication with the central processing unit.

17. A device using at least one code division multiple access carrier for wireless communication with a base station, the device comprising:
 a transmitter, the transmitter transmitting a first signal to the base station using a first designated carrier; and
 a central processing unit in operative communication with the transmitter, the central processing unit:
  determining an operational profile, the operational profile including a degree of unit mobility;
  selecting the first designated carrier based on the determined operational profile; and
  establishing a wireless communication link with the base station using the first designated carrier;
 detecting a change in the operational profile;
 selecting a revised first designated carrier for wireless code division multiple access communication, the revised first designated carrier being based on the change in the operational profile; and
 establishing a wireless communication link with the base station using the revised first carrier,
 wherein the revised first designated carrier corresponds to one of an asynchronous code division multiple access link and a synchronous code division multiple access link.

18. The device according to claim 17, wherein selection of the revised first designated carrier is further based on a quantity of available synchronous code division multiple access spreading codes.

19. The device according to claim 18, wherein the revised selected first designated carrier corresponds to the asynchronous code division multiple access link if the quantity of available synchronous code division multiple access spreading codes is less than a predetermined quantity.

20. A base station using at least one code division multiple access carrier for receiving wireless communication from a device, the base station comprising:
 a central processing unit in operative communication with the transmitter, the central processing unit:
  determining an operational profile of the device, the operational profile including a degree of unit mobility;
  selecting a first designated carrier based on the determined operational profile; and
  establishing a wireless communication link with the device using the first designated carrier; and
 a receiver, the receiver receiving a first signal from the device using the first designated carrier,
 wherein the first designated carrier corresponds to one of an asynchronous code division multiple access communication link and a synchronous code division multiple access communication link.

21. The base station according to claim 20, wherein selection of the first designated carrier is further based on a quantity of available synchronous code division multiple access spreading codes.

22. The base station according to claim 21, wherein the first designated carrier corresponds to the asynchronous code division multiple access link if the quantity of available synchronous code division multiple access spreading codes is less than a predetermined quantity.

23. The base station according to claim 20, the central processing unit further:
 detecting a change in the operational profile of the device;
 selecting a revised first designated carrier for wireless code division multiple access communication, the revised first designated carrier being based on the change in the operational profile; and
 establishing a wireless communication link with the device using the revised first carrier.

24. The base station according to claim 23, wherein the revised selected first designated carrier corresponds to the asynchronous code division multiple access link if the quantity of available synchronous code division multiple access spreading codes is less than a predetermined quantity.

25. The base station according to claim 20, wherein the receiver receives a second signal from the device using a second designated carrier.

26. The base station according to claim 25, wherein the received second signal includes data corresponding to a degree of mobility, the central processing unit further determining the degree of mobility of the device based on the received second signal data.

27. The base station according to claim 25, wherein the received second signal includes data corresponding to a velocity of the device, the central processing unit further determining the degree of mobility of the device based on the velocity of the device.

* * * * *

UNITED STATES PATENT AND TRADEMARK OFFICE
CERTIFICATE OF CORRECTION

PATENT NO.     : 6,930,470 B2
DATED          : August 16, 2005
INVENTOR(S)    : Shalini S. Periyalwar et al.

It is certified that error appears in the above-identified patent and that said Letters Patent is hereby corrected as shown below:

Column 12,
Line 31, insert the word -- division -- after the word "code" and before the word "multiple".

Signed and Sealed this

Sixth Day of December, 2005

JON W. DUDAS
*Director of the United States Patent and Trademark Office*